United States Patent
Cao et al.

(10) Patent No.: US 10,833,822 B2
(45) Date of Patent: Nov. 10, 2020

(54) SYSTEM AND METHOD FOR MA SIGNATURE ASSIGNMENT BASED ON UE GROUP SEPARATION

(71) Applicants: Yu Cao, Kanata (CA); Mohammadhadi Baligh, Ottawa (CA); Liqing Zhang, Ottawa (CA)

(72) Inventors: Yu Cao, Kanata (CA); Mohammadhadi Baligh, Ottawa (CA); Liqing Zhang, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 247 days.

(21) Appl. No.: 15/495,308

(22) Filed: Apr. 24, 2017

(65) Prior Publication Data

US 2018/0309553 A1  Oct. 25, 2018

(51) Int. Cl.
*H04L 5/00* (2006.01)
*H04W 72/04* (2009.01)

(52) U.S. Cl.
CPC .......... *H04L 5/0048* (2013.01); *H04L 5/0094* (2013.01); *H04W 72/046* (2013.01); *H04W 72/042* (2013.01)

(58) Field of Classification Search
CPC ... H04L 5/0048; H04L 1/0026; H04L 5/0051; H04W 72/042; H04W 52/42
See application file for complete search history.

(56) References Cited

U.S. PATENT DOCUMENTS

| | | | |
|---|---|---|---|
| 2011/0026482 A1 | 2/2011 | Li et al. | |
| 2013/0089163 A1 | 4/2013 | Zhang et al. | |
| 2013/0215861 A1 | 8/2013 | Nam et al. | |
| 2013/0265955 A1* | 10/2013 | Kim | H04W 72/04 370/329 |
| 2013/0301454 A1* | 11/2013 | Seol | H04B 7/043 370/252 |

(Continued)

FOREIGN PATENT DOCUMENTS

| | | |
|---|---|---|
| CA | 2953167 A1 | 2/2016 |
| CN | 101646175 A | 2/2010 |

(Continued)

OTHER PUBLICATIONS

Beatrice Tomasi, Maxime Guillaud, "Pilot Length Optimization for Spatially Correlated Multi-User MIMO Channel Estimation" presented at Asilomar Conference on Signals, Systems, and Computers in Nov. 2015, published on the Internet on Feb. 17/16, 10 pages, and available at https://arxiv.org/abs/1602.05480.

(Continued)

*Primary Examiner* — Romani Ohri

(57) ABSTRACT

In a wireless communication system, user equipments (UEs) may be partitioned into different groups, e.g. based on spatial separation. UEs may use multiple access (MA) signatures that have low or no correlation to each other if the UEs are in the same group. The MA signatures used by one group of UEs may be more correlated with the MA signatures used by another group of UEs. If the UEs are partitioned into the different groups based on spatial separation, then the spatial separation between the different groups may assist in increasing the reliability of detection if two UEs in different groups use correlated MA signatures.

18 Claims, 7 Drawing Sheets

(56) References Cited

U.S. PATENT DOCUMENTS

| | | | | |
|---|---|---|---|---|
| 2014/0011468 A1* | 1/2014 | Park | ............... | H04B 7/0802 455/272 |
| 2014/0071909 A1* | 3/2014 | Frenne | ............... | H04W 72/0406 370/329 |
| 2015/0257073 A1* | 9/2015 | Park | ............... | H04B 7/0408 370/331 |
| 2015/0305062 A1* | 10/2015 | Sung | ............... | H04W 74/002 370/329 |
| 2016/0197659 A1* | 7/2016 | Yu | ............... | H04W 16/28 370/335 |
| 2016/0285660 A1* | 9/2016 | Frenne | ............... | H04L 27/261 |
| 2017/0111147 A1 | 4/2017 | Cao et al. | | |
| 2017/0331670 A1* | 11/2017 | Parkvall | ............... | H04J 11/0056 |
| 2017/0338925 A1* | 11/2017 | Wei | ............... | H04L 5/0048 |
| 2018/0145807 A1* | 5/2018 | Nagata | ............... | H04W 76/27 |
| 2019/0013912 A1* | 1/2019 | Tomeba | ............... | H04B 7/0626 |

FOREIGN PATENT DOCUMENTS

| | | |
|---|---|---|
| CN | 102238733 A | 11/2011 |
| CN | 104967582 A | 10/2015 |
| WO | 2014090200 A1 | 6/2014 |
| WO | 2014198346 A1 | 12/2014 |

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211 v12.5.0 (Mar. 2015), 136 pages.

* cited by examiner

SYSTEM AND METHOD FOR MA SIGNATURE ASSIGNMENT BASED ON UE GROUP SEPARATION

FIELD

The present application relates to assigning a multiple access (MA) signature, such as a reference signal, for use by a user equipment (UE) in uplink wireless communication.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular interval in time. The frequency and time interval used are examples of resources, sometimes called "time-frequency resources".

Some wireless communication systems may support grant-based uplink transmissions. That is, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency resources in an uplink orthogonal frequency-division multiple access (OFDMA) frame.

Some wireless communication systems may support grant-free uplink transmissions. That is, a UE may send uplink transmissions using certain uplink resources possibly shared with other UEs, without specifically requesting use of the resources and without specifically being granted the resources by the base station. A grant-free uplink transmission does not need a dynamic and explicit scheduling grant from the base station.

An uplink transmission sent by a UE may utilize a multiple access (MA) signature. An MA signature may include, but is not limited to, at least one of the following: a reference signal, e.g. a reference signal for channel estimation, such as a demodulation reference signal (DMRS); a codebook/codeword; a sequence; an interleaver and/or mapping pattern; a preamble; a spatial-dimension; and a power-dimension. A reference signal sequence, as used herein, may refer to a particular sequence and/or multiplexing pattern of a reference signal, e.g. a frequency division multiplexing (FDM) pattern. Therefore, two different reference signal sequences may mean two reference signals having different sequences or two reference signals having different multiplexing patterns or two reference signals having both different sequences and different multiplexing patterns.

If a group of UEs is served by the base station, and each UE of the group of UEs sends a respective uplink transmission on the same time-frequency resources, then ideally each UE would use a different MA signature. Moreover, ideally the MA signature used by each UE would have no or very little correlation with the MA signatures used by the other UEs, in order to facilitate more reliable detection by the base station. For example, ideally each UE would use a reference signal sequence that is orthogonal to the reference signal sequences used by the other UEs. However, in practice there may be situations in which the same or correlated MA signatures are sometimes used by more than one UE, which may decrease the reliability of MA signature detection at the base station.

SUMMARY

Embodiments are described in which UEs are partitioned into different groups. For example, the UEs may be partitioned into different groups based on spatial separation. UEs may use MA signatures that have low or no correlation to each other if the UEs are in the same group. The MA signatures used by one group of UEs may be more correlated with the MA signatures used by another group of UEs. If the UEs are partitioned into the different groups based on spatial separation, then the spatial separation between the different groups may assist in increasing the reliability of detection if two UEs in different groups use correlated MA signatures.

For example, in one embodiment. UEs are partitioned into the different groups based on spatial separation. Each group is therefore referred to as a spatial group. UEs in a first spatial group may choose reference signals from a first pool of orthogonal reference sequences, and UEs in a second spatial group may choose reference signals from a second pool of orthogonal reference sequences. The first pool of reference sequences may be non-orthogonal to the second pool of reference sequences. If a first UE in the first spatial group sends an uplink transmission on the same time-frequency resources as a second UE in the second spatial group, the base station may still be able to perform reliable detection for the following reason: although the reference signal used by the first UE is non-orthogonal to the reference signal used by the second UE, the first UE and the second UE have spatial separation which may allow the base station to better distinguish between the two reference signals. In one embodiment, there is provided a method performed by a base station. The method includes transmitting a message to a UE. The message assigns to the UE at least one MA signature from a set of MA signatures associated with a first spatial group to which the UE belongs. The first spatial group is one of a plurality of spatial groups. Each one of the plurality of spatial groups has an associated set of MA signatures. The method may further include receiving an uplink transmission from the UE. The uplink transmission uses an MA signature from the at least one MA signature.

In the preceding embodiment, the first spatial group may be based on: a physical location of the UE, and/or a spatial correlation between an uplink channel of the UE and an uplink channel of at least one other UE, and/or a beam association for the UE.

In any one of the preceding embodiments, the method performed by the base station may further include processing the uplink transmission from the UE using beamforming processing that is different from beamforming processing used to process another uplink transmission from another UE in a different spatial group.

In any one of the preceding embodiments, the set of MA signatures associated with the first spatial group may be reference signal sequences. The reference signal sequences may be used by the base station, e.g. for uplink channel estimation. In some embodiments, the set of reference signal sequences associated with the first spatial group are: orthogonal to each other, and non-orthogonal to other reference signal sequences associated with another spatial group of the plurality of spatial groups.

In any one of the preceding embodiments, the assigning to the UE the at least one MA signature may be implemented by the base station transmitting, to the UE, an indication of the first spatial group. In some embodiments, the indication is semistatically or dynamically signalled. In some embodiments, signaling of the indication occurs in: a broadcast channel, and/or higher layer signaling, and/or a downlink control channel.

In any one of the preceding embodiments, the uplink transmission received from the UE is a grant-free uplink transmission.

In another embodiment, there is provided a base station including a UE group separator to determine a first spatial group to which a UE belongs. The first spatial group is one of a plurality of spatial groups. Each one of the plurality of spatial groups is associated with a respective set of MA signatures. The base station may further include a transmitter to transmit a message to the UE. The message assigns to the UE at least one MA signature from the set of MA signatures associated with the first spatial group. The base station may further include a receiver to receive an uplink transmission from the UE. The uplink transmission uses an MA signature from the at least one MA signature.

In the preceding embodiment, the first spatial group may be based on: a physical location of the UE, and/or a spatial correlation between an uplink channel of the UE and an uplink channel of at least one other UE, and/or a beam association for the UE.

In any one of the preceding embodiments, the receiver may be configured to process the uplink transmission from the UE using beamforming processing that is different from beamforming processing used to process another uplink transmission from another UE in a different spatial group.

In any one of the preceding embodiments, the set of MA signatures associated with the first spatial group may be reference signal sequences. The reference signal sequences may be used by the base station, e.g. for performing uplink channel estimation. In some embodiments, the set of reference signal sequences associated with the first spatial group are: orthogonal to each other, and non-orthogonal to other reference signal sequences associated with another spatial group of the plurality of spatial groups.

In any one of the preceding embodiments, the message assigning the at least one MA signature to the UE may comprise an indication of the first spatial group.

In another embodiment, there is provided a method performed by a UE. The method includes determining an MA signature from a first set of MA signatures associated with a first spatial group to which the UE belongs. The first spatial group is one of a plurality of spatial groups. Each one of the plurality of spatial groups has an associated set of MA signatures. The method may further include transmitting an uplink transmission using the MA signature.

In the preceding embodiment, the first set of MA signatures may be reference signal sequences. The reference signal sequences may be used by the base station, e.g. for uplink channel estimation. In some embodiments, the first set of reference signal sequences are: orthogonal to each other, and non-orthogonal to other reference signal sequences associated with another spatial group of the plurality of spatial groups.

In any one of the preceding embodiments, the method may further include receiving an assignment of the MA signature from a base station.

In any one of the preceding embodiments, the method may further include receiving a message, from a base station, that indicates the first spatial group. The UE determining the MA signature may be implemented by retrieving, from memory of the UE, the MA signature based on the indication of the first spatial group.

In any one of the preceding embodiments, the method may further include the UE determining the first spatial group and the UE determining the MA signature by retrieving, from memory of the UE, the MA signature based on the indication of the first spatial group.

In another embodiment, there is provided a UE including a memory to store at least one MA signature belonging to a first set of MA signatures associated with a first spatial group to which the UE belongs. The first spatial group being one of a plurality of spatial groups, and each one of the plurality of spatial groups associated with a respective set of MA signatures. The UE may further include a transmitter to transmit an uplink transmission using the at least one MA signature.

In the preceding embodiment, the first set of MA signatures may be reference signal sequences. The reference signal sequences may be used by the base station, e.g. for uplink channel estimation. In some embodiments, the first set of reference signal sequences are: orthogonal to each other, and non-orthogonal to other reference signal sequences associated with another spatial group of the plurality of spatial groups.

In any one of the preceding embodiments, the UE may further include a receiver to receive an assignment of the at least one MA signature from a base station. In some embodiments, the assignment is an indication, in a message, that indicates the first spatial group. In other embodiments, the UE includes a UE group selector to determine the first spatial group.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
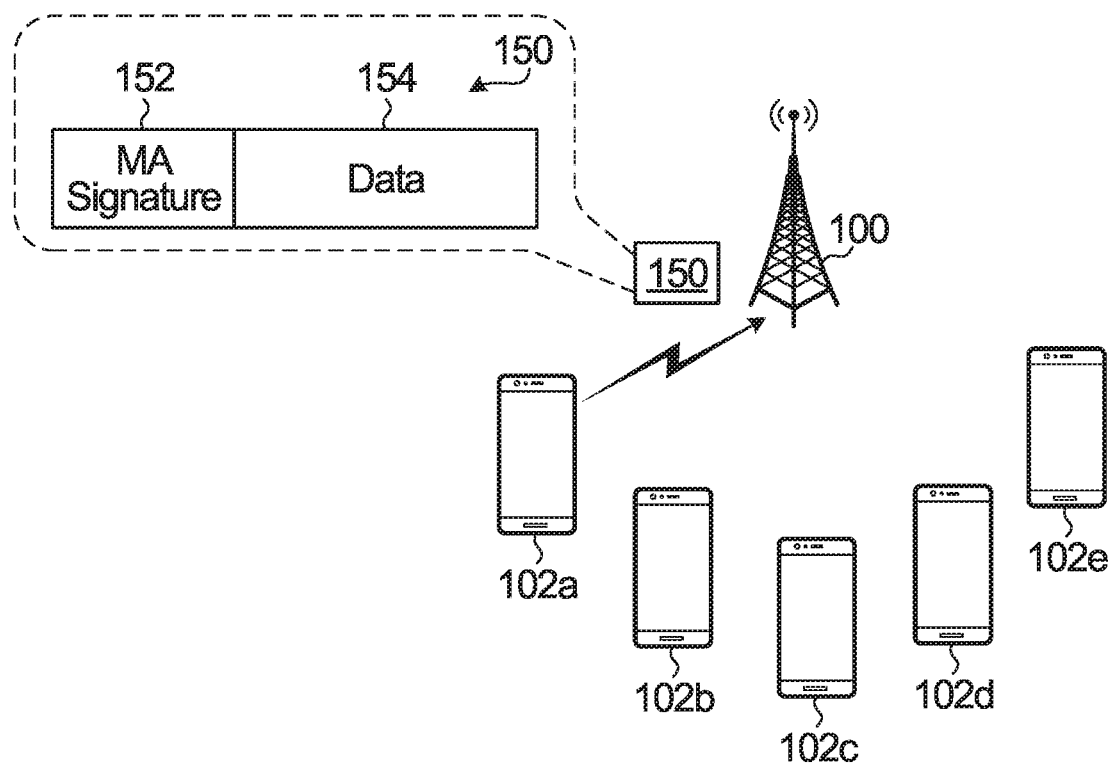
FIG. 1 is a block diagram of a base station and a plurality of UEs, according to one embodiment.

FIG. 1 is a block diagram of a base station 100 and a plurality of UEs 102a-e, according to one embodiment.

The word "base station" encompasses any device that wirelessly receives data in the uplink from wireless devices, such as from UEs 102a-e. The base station 100 is an example of a network access device that provides network access to UEs 102a-e. The base station 100 therefore encompasses access devices, including: a transmit and receive point, a base transceiver station, a radio base station, a radio access node, a network node, a transmit/receive node, a Node B, an eNode B (eNB), a gNB, which is sometimes called a "gigabit" Node B, a relay station, a remote radio head, or an access point (AP). Also, in some embodiments, the functions of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform processing operations, such as scheduling and message generation, and that are not necessarily part of the equipment housing the antennas of the base station 100. The modules may also be coupled to other base stations. In some embodiments, the base station 100 may actually be a plurality of base stations that are operating together to serve the UEs 102a-e, e.g. through coordinated multipoint transmissions.

Similarly, UEs 102a-e are also meant to be illustrative of other end user devices, which may be configured as disclosed herein for uplink communications with the base station 100. Examples of other end user devices include: wireless transmit/receive units (WTRUs), mobile stations, fixed or mobile subscriber units, cellular telephones, personal digital assistants (PDAs), smart phones, laptops, computers, wireless sensors, and consumer electronics devices.

Embodiments will first be described in which the base station 100 partitions the UEs into different groups, and the UEs 102a-e perform grant-free uplink transmissions. In some of the specific examples below, the different groups are formed based on spatial separation, and will be referred to as "spatial groups". However, more generally, the groups do not have to be based on spatial separation. In another example, the different groups may be formed based on different application types. For example, one group of UEs may be enhanced mobile broadband (eMBB) UEs, and another group of UEs may be massive machine type communication (mMTC) UEs. In other examples, the group separation may be in the time-frequency domain or the code domain. In another example, the reference signal and/or data of two groups of UEs may have been applied with different code sequence/signatures that are orthogonal or quasi-orthogonal to each other. In another example, the two groups of UEs may be separated by time-frequency resources, completely or partially. As another example, the two groups may be two cells among a hyper cell or a cellular network. UEs in the two cells may interfere with each other, but the interference is small with respect to the interferences among two UEs in the same cell due to geometry separation. Other variations will be described later, including embodiments in which grant-based uplink transmissions are sent by the UEs, and including embodiments in which a UE determines the spatial group to which the UE belongs.

In FIG. 1, the UEs 102a-e may each send a grant-free uplink transmission to the base station 100 on particular uplink time-frequency resources. The uplink time-frequency resources on which grant-free transmissions are sent will be referred to as "grant-free uplink resources". For example, the grant-free uplink resources may be a designated region in an OFDMA frame. The UEs 102a-e may use the designated region to send their grant-free uplink transmissions, but the base station 100 does not know which of the UEs 102a-e, if any, are going to send a grant-free uplink transmission in the designated region. Because the UEs 102a-e use the same grant-free uplink resources, the grant-free uplink transmissions are contention-based transmissions.

Grant-free uplink transmissions may be suitable for transmitting bursty traffic with short packets from the UEs 102a-e to the base station 100, and/or for transmitting data to the base station 100 in real-time or with low-latency. Examples of applications in which a grant-free uplink transmission scheme may be utilized include: mMTC, ultra-reliable low latency communications (URLLC), smart electric meters, teleprotection in smart grids, and autonomous driving. However, grant-free uplink transmission schemes are not limited to these applications.

FIG. 1 illustrates an example message 150 sent by UE 102a in a grant-free uplink transmission. The message 150 is transmitted using a multiple access (MA) resource. A MA resource includes a MA physical resource, e.g. a time-frequency partition or block, and at least one MA signature. As mentioned above, the MA signature may include, but is not limited to, at least one of the following: a reference signal, e.g. a reference signal for channel estimation, such as a demodulation reference signal (DMRS); a codebook/codeword; a sequence; an interleaver and/or mapping pattern; a preamble; a spatial-dimension; and a power-dimension. The term "pilot signal" refers to a signal that at least includes a reference signal, e.g. a DMRS. The MA signature may be the reference signal in the pilot signal.

The message 150 includes MA signature 152, as well as data 154, which is to be decoded by the base station 100. The message 150 may include other information, such as information for identifying the UE 102a and/or cyclic redundancy check (CRC) information, but this has been omitted for the sake of clarity. The MA signature 152 is illustrated as being separate from the data 154. This may be the case if, for example, the MA signature 152 consists of a reference signal and/or a preamble. However, the MA signature 152 may instead be part of the transmission scheme itself, e.g. the codebook used or the mapping or interleaving pattern used, in which case the MA signature 152 would not necessarily occupy separate time-frequency resources from the data 154. Also, in embodiments in which the MA signature 152 does occupy separate time-frequency resources from the data 154, the MA signature 152 does not necessarily have to be at the start of the message 150.

When UE 102a sends message 150 to the base station 100 in the grant-free uplink transmission, the base station 100 first attempts to detect the MA signature 152. MA signature detection may involve a blind detection process in which the MA signature 152 is detected among all of the possible choices of MA signatures. Detecting the MA signature to find out which MA signature is utilized in the uplink transmission is referred to as MA signature activity detection, or in short, activity detection. When detecting the MA signature also reveals the identity of the UE, the process may also be called UE activity detection or UE detection. After activity detection is successful, the base station 100 then attempts to perform uplink channel estimation based on the MA signature 152, and optionally also based on additional reference signals in the message 150. The base station 100 then attempts to decode the data 154. As an example, the MA signature 152 may be a reference signal. The base station 100 may first successfully perform activity detection by successfully decoding the reference signal sequence. The reference signal sequence may then be used by the base station 100 for channel estimation of the uplink channel. Once the reference signal is successfully decoded and channel estimation is performed, the base station 100 then decodes the data 154.

Figure 2:
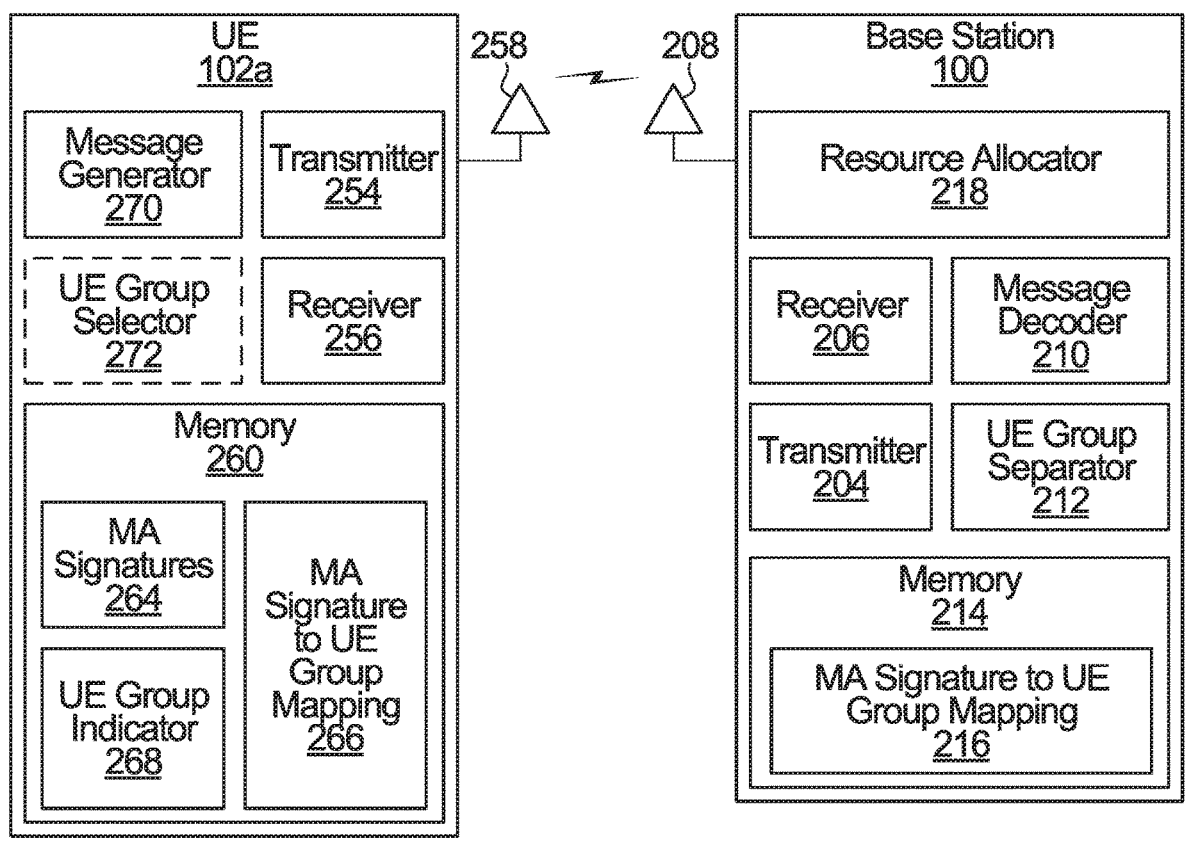
FIG. 2 is a block diagram showing a base station and UE in more detail, according to one embodiment.

FIG. 2 is a block diagram showing the base station 100 and UE 102a of FIG. 1 in more detail. The base station 100 includes a transmitter 204 and a receiver 206 coupled to one or more antennas 208. Only one antenna 208 is illustrated. The transmitter 204 and the receiver 206 may be integrated as a transceiver. The base station 100 further includes a message decoder 210 for performing activity detection by detecting the MA signature 152, and for decoding the data 154 in the grant-free uplink message 150. The decoder 210 may be part of the receiver 206. The base station 100 further includes a UE group separator 212 for partitioning the UEs 102a-e into different groups. The base station 100 further includes a memory 214. Information is stored in the memory 214 that defines the mapping between MA signatures and the different UE groups. This information is indicated at 216 and may be stored in a table. The base station 100 further includes a resource allocator 218, which may determine which uplink resources are allocated to UEs 102a-e for uplink transmissions. For example, the resource allocator 218 may assign a particular partition of time-frequency resources to be used by UEs 102a-e for sending any grant-free uplink transmissions the UEs 102a-e may have to send.

The decoder 210, the UE group separator 212, the resource allocator 218, and/or any signal processing components of the transmitter 204 and receiver 206, may be implemented in the form of circuitry configured to perform the functions of the decoder 210, the UE group separator 212, the resource allocator 218, and the transmitter 204/receiver 206. In some implementations the circuitry includes a memory and one or more processors that execute instructions that cause the one or more processors to perform the operations of the decoder 210, the UE group separator 212, the resource allocator 218, and/or the transmitter 204/receiver 206. Alternatively, the decoder 210, the UE group separator 212, the resource allocator 218, and/or any signal processing components of the transmitter 204 and/or receiver 206, may be implemented using dedicated integrated circuitry, such as an application specific integrated circuit (ASIC), a graphics processing unit (GPU), or a programmed field programmable gate array (FPGA) for performing the operations of the decoder 210, the UE group separator 212, the resource allocator 218, and/or the transmitter 204/receiver 206. In yet other implementations, the functionality of the base station 100 described herein may be fully or partially implemented in software or modules stored in the memory and executed by the one or more processors.

The UE 102a also includes a transmitter 254 and a receiver 256 coupled to one or more antennas 258. Only one antenna 258 is illustrated. The transmitter 254 and the receiver 256 may be integrated as a transceiver. The UE 102a further includes a memory 260. MA signatures 264 that may be used by the UE 102a are stored in memory 260. Alternatively, an indication of the MA signatures that may be used by UE 102a may be stored in memory 260, rather than the MA signatures themselves. Information is also stored in the memory 260 that defines the mapping between different ones of the MA signatures 264 and different UE groups. This information is indicated at 266 and may be stored in a table. As an example, there may be eight MA signatures stored in memory 260, and the table at 266 may indicate that MA signatures one to four are assigned to a first UE group and that MA signatures five to eight are assigned to a second UE group. An indication 268 of the UE group to which the UE 102a currently belongs may also be stored in the memory 260. The indication 268 may be a group index received from the base station 100. The group index identifies the group. The UE 102a further includes a message generator 270 for generating messages to be transmitted in uplink transmissions. Generating the messages may include encoding and modulating the data to be transmitted in the message. The message generator 270 may use the indication 268 in memory to determine the UE group to which the UE 102a currently belongs, and then to select an MA signature from the memory 260 that is from the pool of MA signatures assigned to that UE group. Optionally, the UE 102a further includes a UE group selector 272 that is present in alternative embodiments described later in which the UE 102a determines the group to which the UE 102a belongs.

The message generator 270, the UE group selector 272 (when present), and/or any signal processing components of the transmitter 254 and receiver 256, may be implemented in the form of circuitry configured to perform the functions of the message generator 270, the UE group selector 272, and/or the transmitter 254/receiver 256. In some implementations the circuitry includes a memory and one or more processors that execute instructions that cause the one or more processors to perform the operations of the message generator 270, the UE group selector 272, and/or the transmitter 254/receiver 256. Alternatively, message generator 270, the UE group selector 272, and/or any signal processing components of the transmitter 254 and receiver 256, may be implemented using dedicated integrated circuitry, such as an ASIC, a GPU, or an FPGA for performing the operations of the message generator 270, the UE group selector 272, and/or the transmitter 254/receiver 256. In yet other implementations, the functionality of the UE 102a described herein may be fully or partially implemented in software or modules stored in the memory and executed by the one or more processors.

The UEs 102b-e are not shown in detail in the figures, but UEs 102b-e have the same components as UE 102a illustrated in FIG. 2.

In operation, in one embodiment the UE group separator 212 of the base station 100 determines a respective group to which each one of UEs 102a-e belongs. Each group has an associated group index identifying the group, and each group index corresponds to a pool of MA signatures defined by the mapping stored at 216 in the memory 214. The group index for each UE is sent to that UE. For example, the group index for UE 102a is sent from the base station 100 to UE 102a and is stored as UE group indicator 268.

Figure 3:
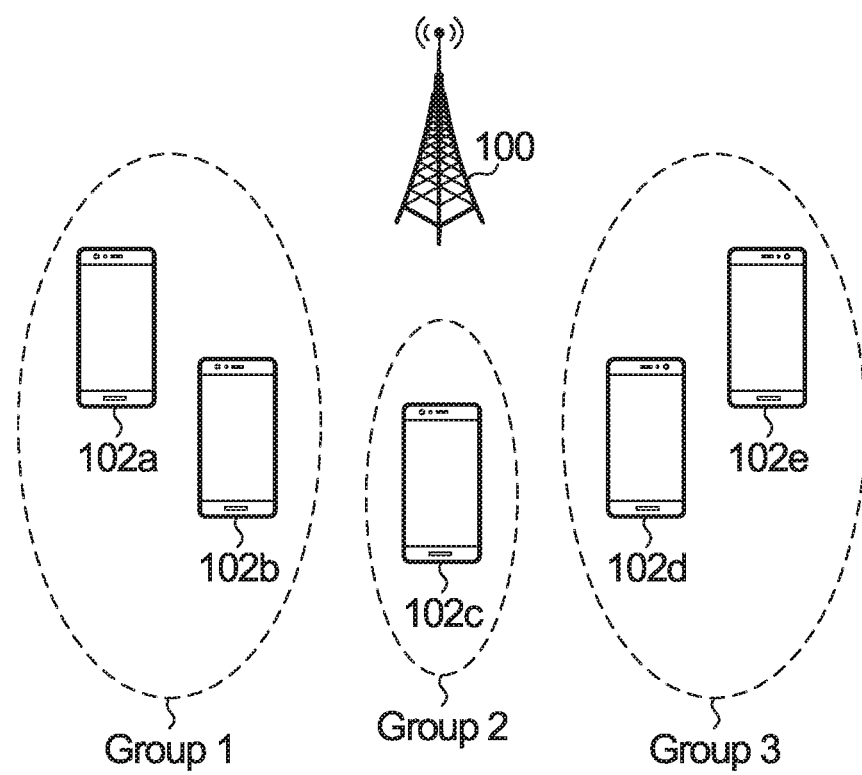
FIG. 3 illustrates an example of a plurality of UEs being partitioned into three groups.

FIG. 3 illustrates an example in which UE group separator 212 of the base station 100 has partitioned the UEs 102a-e into three groups. Group 1 includes UEs 102a and 102b, group 2 includes UE 102c, and group 3 includes UEs 102d and 102e. The pool of MA signatures corresponding to each of the groups is determined in advance and stored in the memory 260 of each UE 102a-e and in the memory 214 of the base station 100. As shown in FIG. 3, group 1 corresponds to MA signatures 1 to 8, group 2 corresponds to MA signatures 9 to 16, and group 3 corresponds to MA signatures 17 to 24. Once the base station 100 has partitioned the UEs 102a-e into the three spatial groups, the base station 100 transmits, to each of UEs 102a-e, the group index 268 indicating the spatial group to which the UE belongs. For example, because UE 102a is assigned to group 1, the base station 100 transmits to UE 102a the group index 268 indicating group 1.

When UE 102a is to send a grant-free uplink message, the message generator 270 uses an MA signature from group 1. When UE 102b is to send a grant-free uplink message. UE 102b also uses an MA signature from group 1. When UE 102c is to send a grant-free uplink message, UE 102c uses an MA signature from group 2. When UE 102d or 102e is to send a grant-free uplink message, UE 102d or 102e uses an MA signature from group 3.

In some embodiments, the MA signatures within a group are not correlated or only have low correlation. Correlation is a general term in statistics that is typically used to measure the dependency of two random variables or random processes. For example, two MA signatures can be treated as two discrete time sequences of bits or complex values $x_n$ and $y_n$. The cross-correlation of the two sequences measures the similarity between x and shifted (lag) copies of y as a function of the lag. For finite length deterministic sequences, such as the given MA signature sequences used, the cross-correlation may be computed as $$\hat{R}_{xy}(m) = \sum_{n=0}^{N-m-1} x_{n+m} y_n^* \text{ for } m \geq 0 \text{ and}$$

$$\hat{R}_{xy}(m) = \hat{R}_{yx}^*(m) \text{ for } m < 0$$

There may be a further normalization step applied to the correlation function. When the cross-correlation function is applied to the sequence with respect to the sequence itself, it becomes an auto-correlation function. For simplicity, we refer to cross-correlation and auto-correlation as correlation in this disclosure. When m=0, the cross-correlation $\hat{R}_{xy}(0)$ is the same as the inner product of the two vectors defined by the two sequences. When $\hat{R}_{xy}(0)=0$, the two sequences may be called orthogonal or not correlated. When $\hat{R}_{xy}(0)$ is close to 0, the two sequences may be called near orthogonal or have low correlations. The above is a typical way of defining correlation and orthogonality of two sequences. There may be other ways of defining correlation and orthogonality, e.g. having similar properties to the definition above, and which can also be applied here. Two reference signal sequences that have low cross-correlation (e.g., near orthogonal sequences) results in low mutual interference among the RS signals.

If UE 102a and 102b transmit on the same time-frequency resources and both use an MA signature from group 1, then as long as UE 102a and 102b do not use the same MA signature, successful activity detection by the base station 100 may be more likely because the different MA signatures in group 1 are not correlated with each other or only have low correlation with each other. There may be higher correlation between MA signatures from different groups.

In some embodiments, the UE groups are based on spatial separation. Two UEs can be said to be spatially separated if it is possible to distinguish the two UEs' signals in the spatial domain due to the spatial properties of the two UEs. For example, the two UEs may have different beam angles or directions with respect to the base station, or the channel matrices of the two UEs may have low correlations or nearly orthogonal such that their signals can be separated using appropriate receivers (e.g. zero-forcing or MMSE receiver). In the example illustrated in FIG. 3, UE 102a and 102b are spatially separated from UEs 102d and 102e, and therefore UEs 102a and 102b are in a different group from UEs 102d and 102e. As mentioned above, when groups are determined based on spatial separation of the UEs, the groups will be referred to as spatial groups.

In some embodiments, the coverage area of the base station may be arbitrarily or statically divided into a number of radial wedges, and each radial wedge assigned a respective MA signature group. Two UEs on opposite sides of a boundary between wedges may count as "spatially separated" due to being in different wedges associated with different MA signature groups. Dividing the coverage area into a number of radial wedges is only one possible way to partition the UEs 102a-e into different spatial group. Other ways are described in more detail below, e.g. using location information, such as angle-of-arrival measurements, and/or determining and using the spatial correlation between the uplink channels of different UEs. The spatial separation between the UEs in the different groups may introduce an element of spatial diversity that may allow for more reliable activity detection even when a UE in one group uses an MA signature that is highly correlated with an MA signature used by another UE in another group.

The more MA signatures that are available for use, the less likely that MA signature collision will occur because it is less likely that two UEs will use the same MA signature. However, having a large number of MA signatures often means that some of the MA signatures will be more correlated with other ones of the MA signatures, which may decrease the reliability of activity detection. For example, if two UEs use different MA signatures that are highly correlated, then the base station 100 may be less likely to correctly perform activity detection. By partitioning a larger pool of MA signatures into different groups based on spatial separation, e.g. as in FIG. 3, then the following benefit may be achieved: UEs whose uplink channels have similar spatial properties may use MA signatures that are less correlated or not correlated, and only UEs whose uplink channels have different spatial properties use MA signatures that are more correlated. The spatial diversity due to the spatial separation may allow for more reliable activity detection when different MA signatures are transmitted by different UEs from different spatial groups, e.g. because the receiver 206 of the base station 100 is able to perform beamforming processing specific to each spatial group. Beamforming processing, by the receiver 206, that is specific to a target spatial group may increase the signal-to-noise ratio for the target spatial group for both the pilot signal and the data signal, and also reduce the interference from other spatial groups. There are many different methods for the receiver 206 to perform the beamforming processing. For example, the base station 100 may steer the direction of the beamforming processing to a specific UE in one spatial group by selecting appropriate weight and phases for the received signal at each antenna element of antenna 208 connected to the receiver 206. By modifying the weight and phases for the received signal at each antenna element, the received signal-to-noise-ratio after the beamforming processing for the specific spatial group may be increased and interference from other spatial groups may be suppressed. In some embodiments, the base station 100 may have a large number of antennas, e.g. massive multiple-input multiple-output (m-MIMO), and at least some of the large number of antennas may be used to perform beamforming processing.

FIG. 3 is only one example. There may be more or fewer groups, and in some embodiments MA signatures may be re-used in different groups.

In some embodiments, the partitioning of the UEs into different spatial groups is based on beam association. UEs may be referred to as being grouped into different beams. The beams can be analog beams or digital beams. Group 1 in FIG. 3 may be associated with a first beam. i.e. uplink transmissions from UEs 102a and 102b may be subject to a first beamforming receiver processing at the base station 100 due to the spatial location of UEs 102a and 102b. Group 2 in FIG. 3 may be associated with a second beam. i.e. uplink transmissions from UE 102c may be subject to a second beamforming receiver processing at the base station 100 due to the spatial location of UE 102c. Group 3 in FIG. 3 may be associated with a third beam, i.e. uplink transmissions from UEs 102d and 102e may be subject to a third beamforming receiver processing at the base station 100 due to the spatial location of UEs 102d and 102e. The different beamforming receiver processing for the different groups may increase the reliability of successful activity detection even if two UEs from different groups use highly correlated MA signatures or possibly even the same MA signatures. In some embodiments, there may be different receiver processing at the base station 100, by the receiver 206, for each UE. For example, the receiver beamforming processing for decoding a transmission from a UE may select the receiver beamforming weight to maximize the target UE's signal-to-noise-ratio. However, because the UEs from different spatial groups have different beam directions than the target UE, the receiver beamforming process may also significantly reduce or eliminate the interference from UEs in different spatial groups. The interference of MA signatures between UEs in the same spatial group may be resolved by the low correlation or orthogonality of their MA signatures.

In some embodiments, beam association may be performed using an uplink beam management process. There are many ways to perform the uplink beam management process to obtain the beam association information. For example, if uplink beam management is required, the base station may transmit an uplink beam management trigger to the UE. Then, the UE transmits an uplink reference signal (RS) for uplink beam management using different transmitter beams. The base station then measures the received signal quality of the reference signals transmitted by the UEs. In the measurement process, the base station may use different receiver beamforming processing to verify which receiver beamforming processing provides the highest signal quality. The base station then determines the associated receive and/or transmit beams for the UE and sends a beam-related indication (which indicates the beam association) to the UE. The RS used for uplink beam management may be a Preamble, a sounding reference signal (SRS), a demodulation reference signal (DMRS), a channel state information reference signal (CSI-RS) etc. The beam association procedure can be done during an initial access process or at any other time, and can be updated semi-statically or dynamically. A beam association established during uplink beam management may be used by the base station 100 to obtain the UE spatial groups. Each UE spatial group corresponds to a respective beam of the beam association. Respective MA signatures are then assigned to each UE spatial group. The above is just an example of the beam association process, there may be other ways to do the beam association process, which can be also be applicable for the RS/MA signature group assignment procedure described in this disclosure.

Some examples will now be described for the case in which the MA signatures are reference signals, and in which each group is a spatial group. Each spatial group will be referred to as a different beam. In the following examples, the UE groups are based on spatial separation, i.e. different beams, but the MA signature assignment schemes in the following examples can also apply to other grouping schemes based on other properties.

Figure 4:
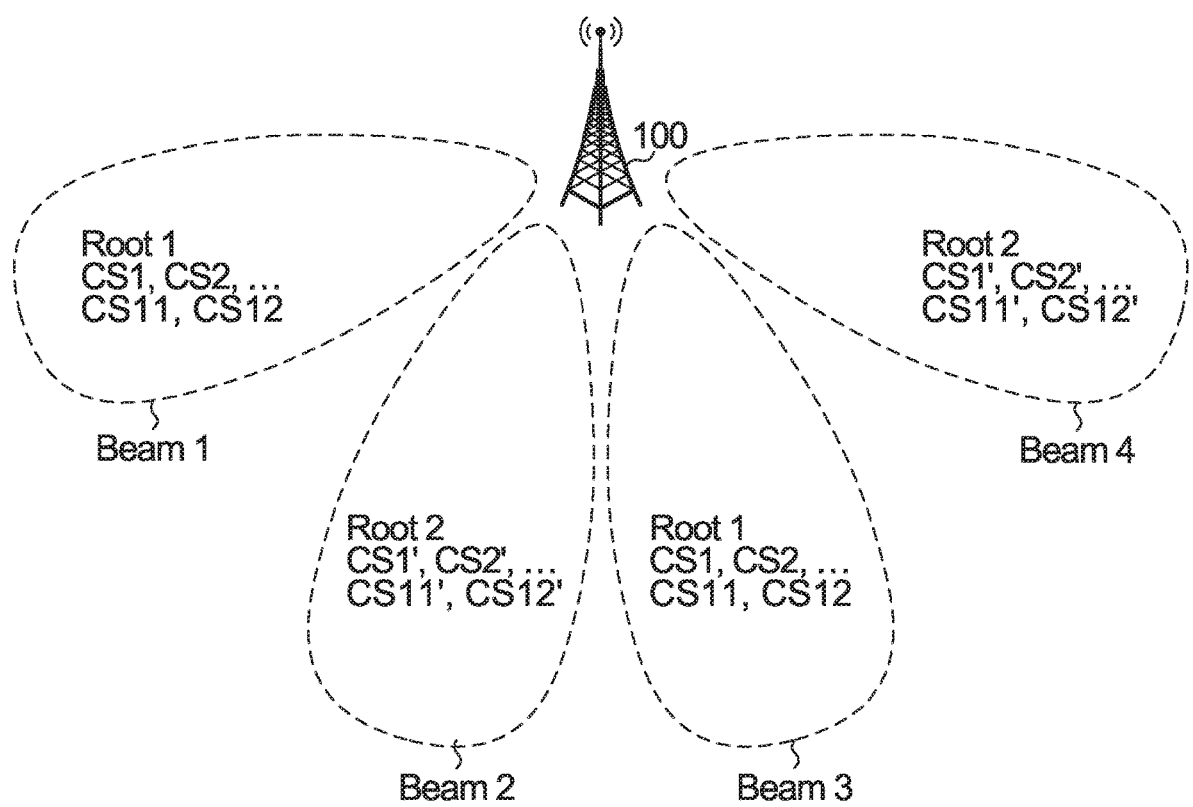
FIG. 4 illustrates an example of four spatial groups.

FIG. 4 illustrates an example in which UEs served by the base station 100 are separated by the UE group separator 212 in the base station 100 into four different beams: 1, 2, 3, and 4. Beam 1 is associated with twelve Zadoff-Chu (ZC) sequences CS1 to CS12 generated by cyclic shifts of a first root. The ZC sequences CS1 to CS12 are orthogonal to each other. Beam 2 is associated with another set of ZC sequences CS1' to CS12' generated by cyclic shifts of a second root. The ZC sequences CS1' to CS12' are orthogonal to each other. Any UEs grouped into beam 1 use only the reference signal sequences CS1 to CS12. Any UEs grouped into beam 2 use only the reference signal sequences CS1' to CS12'.

ZC sequences CS1 to CS12 are non-orthogonal to ZC sequences CS1' to CS12', but ZC sequences CS1 to CS12 have low cross-correlation with ZC sequences CS1' to CS12'. Therefore, mutual interference between a reference signal generated using ZC sequences CS1 to CS12 and another reference signal generated using ZC sequences CS1' to CS12' is low.

In the embodiment described with reference to FIG. 4, the reference signal sequences are re-used for the UEs in a non-adjacent beam. Specifically, beam 3 is also associated with CS1 to CS12, and so any UEs grouped into beam 3 also use reference signal sequences CS1 to CS12. Beam 4 is associated with reference signal sequences CS1' to CS12', and so any UEs grouped into beam 4 use reference signal sequences CS1' to CS12'.

In the embodiment described with reference to FIG. 4, UEs within the same beam use reference signals that are orthogonal to each other, and two UEs in respective different neighbouring adjacent beams use non-orthogonal reference signals. The performance degradation due to the use of non-orthogonal reference signals may be mitigated or eliminated due to the spatial separation. Inter-beam interference may become negligible because of the combination of spatial separation using the receiver beamforming and low-correlation of the sequences. In addition, for grant-free uplink transmission, there may be lower probability of collision because a 24 reference signal sequence pool is increased to an equivalent of a 48 reference signal sequence pool due to the reuse of the 24 reference signal sequences; i.e. the reused reference signal sequences are treated as if they are different reference signal sequences, therefore effectively increasing the reference signal sequence pool to the equivalent of 48 reference signal sequences.

Many variations of the embodiment described with reference to FIG. 4 are possible. As one example, the number of beams may be more or fewer. As another example, a different ZC root may be used for each of the beams. e.g. beam 1 uses cyclic shifts of root 1, beam 2 uses cyclic shifts of root 2, beam 3 uses cyclic shifts of root 3, and beam 4 uses cyclic shifts of root 4. As another example, beam 1 may be associated with reference signals CS1 to CS6, beam 2 may be associated with reference signals CS7 to CS12, beam 3 may be associated with CS1' to CS6', and beam 4 may be associated with CS7' to CS12'. In the two previous examples, there would be no spatial reuse of reference signal sequences across different beams. As another example, all four beams may be associated with the same set of reference signals. For example, a reference signal sequence pool of 96 reference signal sequences may be re-used over the four beams to increase the equivalent reference signal sequence pool to 384, which may lower the probability of reference signal collision.

Also, although ZC sequences are used in the embodiment described with reference to FIG. 4, other types of reference signal sequences may be used instead. For example, pseudorandom noise (PN) sequences may be used instead of ZC sequences. An example is the gold codes/sequences used for LTE downlink DMRS, which are generated using PN sequences. If PN sequences were instead used in the embodiment described with reference to FIG. 4, then in one embodiment: UE group 1 may be associated with the same PN sequence combined with a orthogonal multiplexing scheme (e.g. orthogonal cover codes (OCC), frequency division multiplex (FDM), time division multiplex (TDM) or code division multiplex (CDM)); UE group 2 may be associated with a different PN sequence, e.g. PN sequence generated using a different seeds or initial value, combined with orthogonal multiplexing methods. This way, the reference signals are orthogonal among groups while non-orthogonal (but with low correlation) among group 1 and group 2. In another embodiment, UE group 1 may be associated with the same PN sequences with different cyclic shift (CS) values. Reference signals generated this way may not always be orthogonal to each other, but are nearly orthogonal and more likely to have lower cross-correlation compared to two different PN sequences. UE group 2 may be associated with a PN sequence that is different from group 1, and different CS values can be used among the group.

The MA signatures associated with each UE group do not have to be reference signals. For example, an MA signature can be a codebook or a spreading sequence. For example, the embodiment described above with reference to FIG. 4 may instead be modified so that beam 1 is associated with a first set of sequences {[1 0 1 0], [0 1 0 1]}, beam 2 is associated with a second set of sequences {[1 1 1 0 0], [0 0 1 1]}, beam 3 is associated with a third set of sequences {[1 0 0 1], [0 1 1 0]}, and beam 4 is associated with a fourth set of sequences {[1 0 0 0], [0 1 0 0], [0 0 1 0], [0 0 0 1]}. Sequences in the same set are orthogonal ($R_{xy}(0)=0$), but sequences in different sets are non-orthogonal ($|R_{xy}(0)|>0$). However, the sequences of different sets have only partially overlapped is, and in this example can be considered not as highly correlated as the sets that have completely overlapped 1s. A UE grouped in beam 1 uses a sequence from the first set of sequences for its MA signature when sending a grant-free uplink transmission. A UE grouped in beam 2 uses a sequence from the second set of sequences for its MA signature. A UE grouped in beam 3 uses a sequence from the third set of sequences for its MA signature. A UE grouped in beam 4 uses a sequence from the fourth set of sequences for its MA signature. If the MA signature is the sparse code multiple access (SCMA) codebook used, then each sequence may be a SCMA codebook location pattern indicating where the SCMA symbols will be. If the MA signature is the low density signature (LDS) used, then each sequence may be the spreading sequence/code/signature to be used by the UE.

As another example, the embodiment described above with reference to FIG. 4 may be modified to instead have two beams, with beam 1 associated with a first set of sequences {[1 1 1 1], [1 1 −1 −1], [1 −1 1 −1], [−1 1 −1 −1]} and beam 2 associated with a second set of sequences {[1 1 1 −1], [1 1 −1 1], [1 −1 1 1], [−1 1 1 1]}. Sequences in the same set are orthogonal, but sequences in different sets are non-orthogonal. Also, the sequences in different sets are not highly correlated. A UE grouped in beam 1 uses a sequence from the first set of sequences for its MA signature when sending a grant-free uplink transmission. A UE grouped in beam 2 uses a sequence from the second set of sequences for its MA signature. If the MA signature is the symbol domain spreading sequence used. e.g. as part of a code division multiple access (CDMA) transmission, then each sequence may be a symbol domain spreading sequence to be used by the UE.

There are many different methods by which the UE group separator 212 of the base station 100 may partition the UEs 102a-e into different spatial groups. A few possible methods are described below.

In some embodiments, the base station 100 may partition the UEs 102a-e into different spatial groups based on the physical location of the UEs 102a-e. One possible way to achieve this is to use angle of arrival (AoA) measurements. An AoA measurement is a known method for a base station to determine the direction of propagation of a UE radio-frequency wave received at an antenna array of the base station. The direction may be determined by measuring the time difference of arrival (TDOA) at individual elements of the antenna array at the base station 100. For example, the TDOA measurement may be performed by measuring the difference in received phase at each element in the antenna array of the base station 100. The TDOA measurements are then converted into an AoA measurement. The AoA measurement for an uplink transmission received from a UE is related of the physical location of the UE. UEs within different ranges of AoA values may be considered by the base station 100 to be spatially separated from each other. For example, the UE group separator 212 of the base station 100 may establish three UE spatial groups 1, 2, and 3. When an AoA measurement from one of the UEs 102a-e is less than or equal to threshold $\theta_L$, then that UE is assigned to spatial group 1. When an AoA measurement from one of the UEs 102a-e is greater than threshold $\theta L$ but less than threshold $\theta_H$, then that UE is assigned to spatial group 2. When an AoA measurement from one of the UEs 102a-e is greater than or equal to threshold $\theta_H$, then that UE is assigned to spatial group 3.

Another way to partition the UEs 102a-e into different spatial groups based on the physical location of the UEs 102a-e is to use more explicit location information received from the UEs 102a-e. For example, in some embodiments, the UEs 102a-e may each transmit their GPS coordinates to the base station 100. Based on the received GPS coordinates, the UE group separator 212 of the base station 100 may assign each of the UEs 102a-e to a spatial group. In other embodiments, channel tracking may be used to obtain information pertaining to UE location. Channel tracking may be performed through estimation using a reference signal. For example, a UE may periodically send to the base station 100 a reference signal (RS), e.g a sounding reference signal (SRS) for measuring the channel state information of the UE. The base station 100 uses the RS to track the UE's mobility and location. In some embodiments, each one of UEs 102a-e may determine or estimate its location, e.g. based on the cell in which the UE is located or based on the signal strength received from multiple receive points, and then send the location information to the base station 100. Alternatively, the base station 100 may determine or estimate a UE's location, e.g. based on the cell in which the UE is located or based on the signal strength received from multiple receive points.

In some embodiments, the base station 100 may partition the UEs 102a-e into different spatial groups based on the spatial correlation between the uplink channels of different UEs. If there is low or no spatial correlation between the uplink channels of two different UEs, then those two different UEs may be placed into different spatial groups. For example, if the base station 100 has M antennas, and each UE has only one transmit antenna, then the uplink channel coefficients for a $k^{th}$ UE are $$\vec{h}_k = \begin{bmatrix} h_{1k} \\ h_{2k} \\ \vdots \\ h_{Mk} \end{bmatrix}. \vec{h}_k$$

will be referred to as the channel matrix for the $k^{th}$ UE. The channel covariance matrix for the $k^{th}$ UE is $R_k=E[\vec{h}_k \vec{h}_k^H]$, where E is expectation and H is the Hermitian operator. Note that a single transmit antenna on the UE is used as an example, and for notational simplicity. However, the method may be easily generalized to UEs having multiple transmit antennas. In some embodiments, the channel covariance matrix $R_k$ for the $k^{th}$ UE is fixed or only changes slowly over time. The base station 100 may be able to measure $R_k$ relatively easily in comparison to obtaining knowledge of the actual channel coefficients $\vec{h}_k$, which may require dynamic updating because $\vec{h}_k$ can change dynamically over time. If the base station 100 has knowledge of the channel covariance matrix for each of the UEs 102a-e, then the base station 100 may use the knowledge of the channel covariance matrix of different UEs to find the spatial correlation between different UEs. For example, if two UEs have high spatial correlation, then the two UEs can be grouped into the same spatial group. On the other hand, if the two UEs have low spatial correlation, or have nearly orthogonal channel covariance matrices, then the two UEs can be grouped into different spatial groups. There are many ways to find the spatial correlation. For example, the spatial correlation between two different UEs i and j with known channel covariance matrices may be computed as the correlation matrix of their channel covariance matrices: $R_i^H R_j$. If $tr(R_i^H R_j)$ is close or equal to zero. e.g. below a predetermined threshold, then UEs i and j are assigned to different spatial groups by the UE group separator 212 of the base station 100. If $tr(R_i^H R_j)$ is above the predetermined threshold, then UEs i and j are assigned to the same spatial group by the UE group separator 212 of the base station 100, where tr is the trace of the matrix. In another example, the spatial correlation between the two UEs may be measured as a coefficient $v_i^H v_j$, where $v_i$ is the eigenvector of $R_i$ that is associated with the largest eigenvalue of $R_i$. If $v_i^H v_j$ is close or equal to zero, e.g. below a predetermined threshold, then UEs i and j are assigned to different spatial groups by the UE group separator 212 of the base station 100. If $v_i^H v_j$ is above the predetermined threshold, then UEs i and j are assigned to the same spatial group by the UE group separator 212 of the base station 100.

In another example, the spatial correlation of the two UEs may be measured using the similarity or distance between the channel covariance matrix of the two UEs. There are many ways to measure the distance between two matrices. One example is to use Frobenius distance $F=\sqrt{tr((R_i-R_j)(R_i-R_j)^H)}$, however, in general, any method to compute the distance or similarity between two matrices may be applied. If the distance is close or equal to zero, e.g. below a predetermined threshold, then UEs i and j are assigned to the same spatial groups by the UE group separator 212 of the base station 100. If the distance is above the predetermined threshold, then UEs i and j are assigned to a different spatial group by the UE group separator 212 of the base station 100.

In some embodiments, the base station 100 may have knowledge of actual channel matrix of each UE, i.e. $\vec{h}_k$ for the $k^{th}$ UE. The base station 100 may directly use the channel knowledge to measure the spatial correlation of two UEs. For example, the spatial correlation between two different UEs i and j may be computed as $\vec{h}_i^H \vec{h}_j$. If $\vec{h}_i^H \vec{h}_j$ is close or equal to zero, e.g. below a predetermined threshold, then UEs i and j are assigned to different spatial groups by the UE group separator 212 of the base station 100. If $\vec{h}_i^H \vec{h}_j$ is above the predetermined threshold, then UEs i and j are assigned to the same spatial group by the UE group separator 212 of the base station 100. When a UE has multiple transmit antennas, $\vec{h}_i^H \vec{h}_j$ may be replaced by $v_i^H v_j$, where $v_i$ is the eigenvector of $\vec{h}_i \vec{h}_j^H$ that is associated with the largest eigenvalue of $\vec{h}_i \vec{h}_j^H$.

In another example, the spatial correlation of the two UEs may be measured using the similarity or distance between the channel matrix of the two UEs. There are many ways to measure the distance between two matrices. One example is to use Frobenius distance $F=\sqrt{tr((\vec{h}_i-\vec{h}_j)(\vec{h}_i-\vec{h}_j)^H)}$, however, in general, any method to compute the distance or similarity between two matrices may be applied. If the distance is close or equal to zero. e.g. below a predetermined threshold, then UEs i and j are assigned to the same spatial groups by the UE group separator 212 of the base station 100. If the distance is above the predetermined threshold, then UEs i and j are assigned to different spatial group by the UE group separator 212 of the base station 100.

Figure 5:
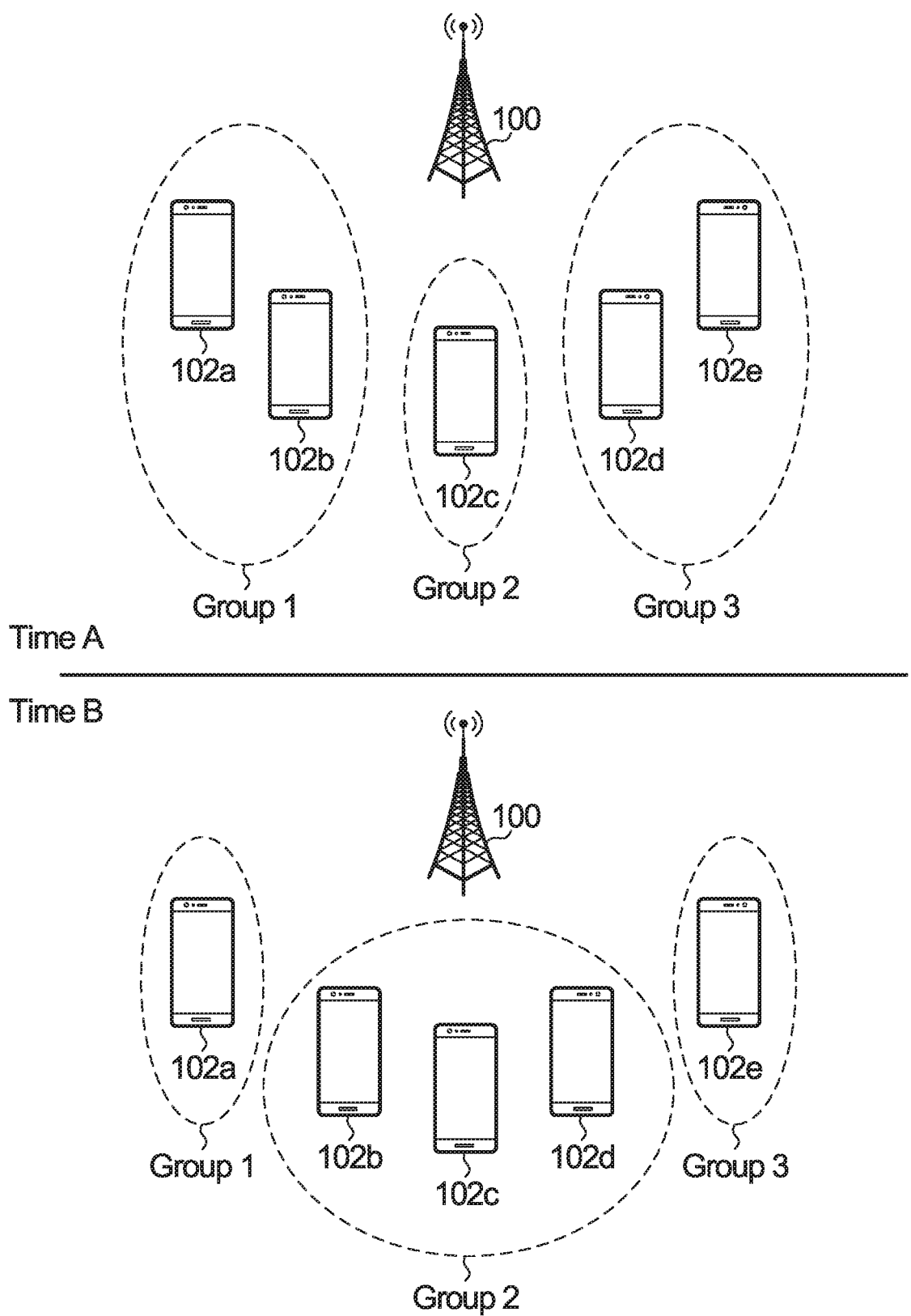
FIG. 5 illustrates the groupings of a plurality of UEs at two different points in time.

No matter how the UE group separator 212 of the base station 100 partitions the UEs 102a-e into different spatial groups, it will be appreciated that the spatial separation between the UEs 102a-e may change over time, e.g. because of physical movement of the UEs 102a-e and/or because of changing channel conditions between the base station 100 and the UEs 102a-c. In some embodiments, the UE group separator 212 of the base station 100 semi-statically re-evaluates and updates the spatial groups to which the UEs 102a-e have been assigned. For example, FIG. 5 illustrates spatial groupings of UEs 102a-e at two points in time. At time A, group 1 includes UEs 102a and 102b, group 2 includes UE 102c, and group 3 includes UEs 102d and 102e. At time B, group 1 include UE 102a, group 2 includes UEs 102b, 102c, and 102d, and group 3 include UE 102e.

In some embodiments, a group index indicating which group a UE is in may be assigned, by the base station 100, when the UE initially accesses the network. The group index may then be updated on a semi-static basis as the UE moves and/or as uplink channel conditions change. The group index may be sent as part of a unicast, multicast, or broadcast transmission in downlink control information. For example, if UEs 102a and UE 102b are both assigned by the base station 100 to spatial group #1, then the base station 100 may send a multicast transmission to UEs 102a and 102b providing the group index identifying spatial group #1.

In some embodiments, when a UE of the UEs 102a-e is to send a grant-free uplink transmission, the UE randomly selects an MA signature from the pool of MA signatures corresponding to the group the UE is within. Random MA signature selection in this manner may be implemented in applications in which there are a large number of UEs in each group compared to the pool of reference signals available, e.g. in mMTC. In other embodiments, one or more of the UEs 102a-e are each assigned, by the base station 100, one or more MA signatures to use for their grant-free uplink transmissions. For example, the UE group separator 212 of the base station 100 first determines which group a UE is within and then assigns to that UE an MA signature to use from the pool of MA signatures associated with that group. Assignment of MA signatures by the base station 100 may be implemented in some URLLC applications.

In embodiments above, the UE group separator 212 of the base station 100 assigns the UEs 102a-e to groups. Alternatively, a UE itself may determine the group to which the UE belongs, and then optionally inform the base station 100. As an example, the UE group separator 212 of the base station 100 may establish the number of spatial groups and the boundaries between spatial groups, and then send that information to UE 102a. During operation, the UE group selector 272 of UE 102a may then monitor the location of UE 102a and determine the spatial group to which the UE 102a belongs. The UE group selector 272 may then update the group indicator 268 stored in its memory 260 to track the spatial group to which the UE 102a belongs. Then, when the message generator 270 is to generate and send an uplink message to the base station 100, the message generator 270 uses an MA signature from the pool of MA signatures corresponding to the spatial group to which the UE 102a belongs. One example way the UE group selector 272 may operate is as follows: the UE group selector 272 receives from the base station 100 information indicating the different spatial groups and the range of GPS coordinates corresponding to each spatial group. The UE group selector 272 then monitors the GPS coordinates of UE 102a during operation. When the GPS coordinates fall within another spatial group different from the spatial group to which the UE 102a currently belongs, then the UE group selector 272 updates the group index 268 to correspond to the new spatial group.

In embodiments above, grant-free uplink transmission is performed by the UEs. The UEs 102a-e are grouped within different UE groups, and a grant-free uplink transmission sent by a UE uses an MA signature from the pool of MA signatures associated with the group to which the UE belongs. However, the use of UE groups may also apply in grant-based uplink transmission schemes. For example, the message generator 270 of the UE 102a may generate a message that is to be sent to the base station 100 using a granted resource. The resource allocator 218 of the base station 100 may have assigned a dedicated time-frequency resource partition to UE 102a to transmit the message, as well as an MA signature to be used by the UE 102a to transmit the message. The MA signature selected by the resource allocator 218 of the base station 100 may be selected from a pool of MA signatures associated with the group to which the UE 102a belongs.

In a grant-based scheme, the base station 100 may receive channel state information (CSI) from the UEs 102a-e. The UE group separator 212 of the base station 100 may be able to use the CSI information when determining the spatial group to which each UE belongs. For example, each one of UEs 102a-e may periodically send to the base station 100 a reference signal, e.g a sounding reference signal (SRS), for measuring the channel information of that UE. The base station 100 may then use the channel information from the reference signal to track the UE's mobility and location.

In some embodiments, the base station may select groups based on beam association. The beam association may be predefined or determined using a beam management process, as described earlier. The UE group separator 212 may re-use the beam association results from the beam management process in order to determine UE groups. For example, UEs belonging to each receive and/or transmit beam may be associated with one group. In some other examples, UEs belonging to multiple adjacent beams may be associated with one group.

Possible benefits of UE group separation for grant-based uplink transmissions may include the following. UEs may be dynamically scheduled and active UE sets are known by the base station 100. MA signature assignment by the base station 100 may be performed dynamically, e.g. the assignment of a reference signal sequence to a UE may be performed dynamically in response to a resource request from the UE, and the reference signal sequence assigned by the base station 100 may be selected from the pool of reference signal sequences associated with the group the UE is within at the time the UE made the resource request. Two UEs having respective channels that are orthogonal or close to orthogonal to each other may be assigned to different groups and may be assigned use of the same reference signals or highly correlated reference signals; whereas UEs within the same group may be assigned orthogonal reference signals or reference signals with generally lower cross-correlation.

In some embodiments, the MA signature (e.g. reference signal sequence) used by a UE may be associated with different antenna ports or different MIMO layers. For example, the base station may assign a reference signal sequence to a UE by signalling a reference signal index, along with optionally one or more antenna port indices. The assignment may be explicit or implicit. In some embodiments, the UE is able to derive the reference signal sequence to be used for each antenna port based on both the reference signal index and the antenna port index. For example, the reference signal sequence to be used for an antenna port may be a function of the reference signal index and the antenna port index. The function may be different for UEs belonging to different groups (e.g. different spatial groups) or different beams. The methodology and mechanisms described herein still apply. For example, if ZC sequences are used for reference signal sequences, then each beam or group may be associated with a root, and the root may be different for different groups/beams. Each UE may then derive the reference signal sequence using: (i) the assigned reference signal sequence index, typically in terms of cyclic shift of an orthogonal cover code index; (ii) the antenna port index; and (iii) the root associated with the group/beam.

Possible benefits of embodiments described herein may include the following. Massive connectivity of UEs to a base station (e.g. m-MTC) may require a large number of MA signatures, e.g. a large number of reference signal sequences. Also, or alternatively, it may be desirable in some applications to have a large number of reference signal sequences to reduce the possibility of reference signal collision, i.e. to reduce the possibility of two UEs using the same reference signal sequence on the same time-frequency resources. For example, it may be desirable to have a large reference signal pool for URLLC applications. Therefore, non-orthogonal reference signal sequences may be used. However, the performance of non-orthogonal reference signal sequences may not be as good as the performance of orthogonal references signal sequences. By utilizing UE spatial groups, as described herein, the spatial domain may be used to help mitigate interference among reference signals and re-use reference signals to increase the effective reference signal sequence size and possibly improve reliability. In some embodiments, having multiple receive antennas (e.g. massive MIMO) and/or advanced signal processing at the base station allows for the receive signal processing based on the spatial group to which the UE belongs.

Collision probability of MA signatures may be reduced even with a limited number of MA signatures in an MA signature pool due to the effective increase in pool size because of spatial separation. For a given time-frequency partition, a larger number of UEs may be served by exploiting both uplink channel separation and MA signature separation. Channel estimation performance may be improved possibly without compromising MA signature collision performance. The performance loss of non-orthogonal reference signals, which may be needed for grant-free transmissions, may be addressed by reference signal sequence planning. A tradeoff may be found between reference signal pool size. e.g. reference signal collision performance, and inter-UE interference performance, e.g. channel estimation performance, which is a characteristic of grant-free reference signal design. Activity detection reliability may be improved, and there may be a reduction in the number of grant-free resources that are required to achieve a certain activity detection reliability in URLLC. More UEs may be served for a given time-frequency partition. A smaller reference signal sequence space with low correlation, or no correlation when orthogonal, may be kept within one beam, and the reference signal sequence space may be expanded to a larger sequence space for different beams. Both low reference signal collision probability, i.e. a large number of reference signal sequences, and good channel estimation performance, i.e. by combining spatial and reference signal sequence separation, may be achieved.

Some embodiments described herein may be beneficial to URLLC grant-free uplink communications, as follows. In many URLLC applications, it may be critical or desirable to avoid or minimize reference signal collision, and to have acceptable activity detection performance and channel estimation performance. For a given partition of grant-free resources, a one-to-one mapping between reference signals and UEs may be used to avoid reference signal collision. However, this may limit the number of UEs that may share the partition of grant-free resources. If orthogonal reference signal sequences are used, then it may only be possible to support a small number of UEs per partition of grant-free resources. If non-orthogonal reference signal sequences are used, then more UEs may be supported per partition of grant-free resources, but the performance of activity detection and channel estimation may be reduced. However, if the beam associated with each UE does not change too quickly, then each UE may be associated with a beam, and each beam may be associated with a respective set of reference signals. The reference signals within a given beam may be orthogonal. The reference signals of different beams may be non-orthogonal. Using different beams that have non-orthogonal reference signals may increase the number of UEs that may be supported per partition of grant-free resources, but reliability may still be maintained by exploiting the spatial separation. Possible benefits include supporting more UEs per partition of resources, or using fewer resources for the same number of UEs, by enabling the use of non-orthogonal reference signals. Reference signal activity detection and channel estimation may still be kept acceptably reliable through the combination of spatial and sequence separation.

Some embodiments described herein may be beneficial to mMTC grant-free uplink communications, as follows. In many mMTC applications, there are a large number of UEs being served compared to the number of reference signal sequences available for use by the UEs. A beam dependent reference signal sequence pool may be used. Within each beam, low correlation or orthogonal reference signal sequences may be used. Then, when a UE is to send a grant-free uplink transmission, the UE randomly selects one reference signal sequence from the reference signal sequence pool associated with the beam index of the UE. The use of a larger reference signal sequence pool, by having non-orthogonal reference signal sequences in different beams, may be possible, and channel estimation performance may still be acceptable due to the spatial separation of UEs using non-orthogonal reference signal sequences.

Figure 6:
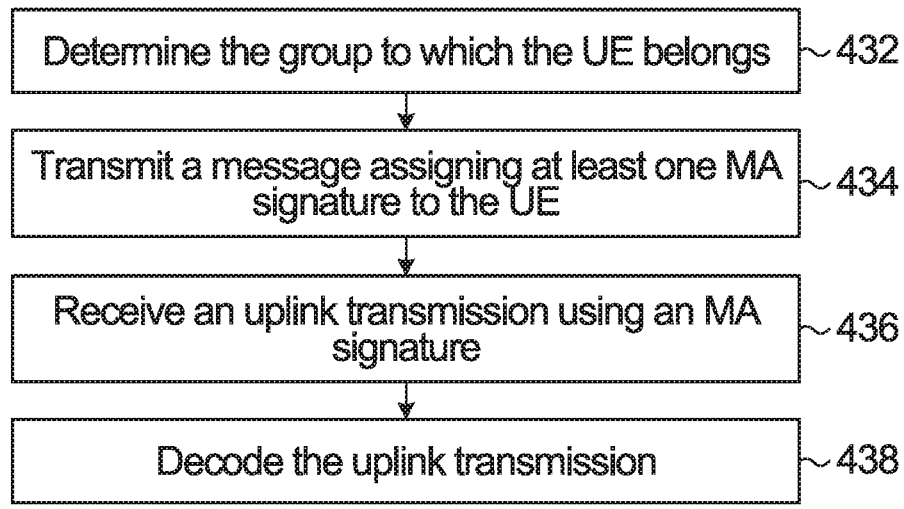
FIG. 6 is a flowchart of a method performed by a base station, according to one embodiment.

FIG. 6 is a flowchart of a method performed by base station 100, according to one embodiment.

In step 432, the base station 100 determines the group to which the UE belongs. Various methods for determining the group to which the UE belongs are described earlier, e.g. the group to which the UE belongs may be determined based on the physical location of the UE, based on spatial correlation, based on the beam association, etc. In some embodiments, the group is a spatial group, e.g. a group that is based on spatial location, such that spatially separated UEs may be in different groups.

Step 432 is optional in that the method may begin after group determination.

In step 434, the base station 100 transmits a message to the UE assigning at least one MA signature to the UE based on the group to which the UE belongs. The at least one MA signature is from a set of MA signatures associated with the group. The group may be a spatial group. In some embodiments, a set of MA signatures may be assigned to the UE that is one of a plurality of subsets of all the MA signatures being used for uplink transmission to the base station. In some embodiments, a single MA signature from the set of MA signatures associated with the group to which the UE belongs may be assigned to the UE. In some embodiments, the assignment of a set of MA signatures may include the assignment of a MA signature pool, of which a UE can select the MA signature to be used for the transmission. The MA signature pool may be a subset of all the MA signatures and may be associated with the group index. Assignment of the at least one MA signature may be explicit. e.g. the at least one MA signature itself, or at least one index identifying the at least one MA signature, may be sent to the UE. In other embodiments, assignment of the at least one MA signature may be implicit, e.g. the assignment occurs by transmitting to the UE an indication of the group to which the UE belongs, such as by transmitting to the UE group indicator 268. The UE then knows the assigned MA signatures based on the group indication, e.g. using MA signature to group mapping 266.

In one embodiment, the following is performed by the components of the base station 100 to execute steps 432 and 434. The UE group separator 212 assigns the UE to a group, e.g. in the manner explained earlier, and then generates a message that either indicates the group to which the UE belongs, or explicitly assigns one or more MA signatures to the UE from the group to which the UE belongs. The transmitter then prepares the message for transmission by performing physical layer processing, e.g. by applying modulation and coding to the message. The message is then transmitted by the transmitter 204 via antenna 208. The message may be transmitted in a control channel.

In step 436, the base station 100 receives an uplink transmission from the UE. The uplink transmission uses an MA signature from the set of MA signatures associated with the group to which the UE belongs. The MA signature is from the at least one MA signature assigned in step 434. In one embodiment, the following is performed by the components of the base station 100 to execute step 436. The uplink transmission is received at receiver 206 via antenna 208. Processing is performed at the receiver 206, such as the beamforming processing described earlier. The processing may be implemented as part of the physical layer of the receiver 206.

In step 438, the uplink transmission is decoded using message decoder 210. Message decoder 210 may be included as part of receiver 206. In one embodiment, the message decoder 210 first performs activity detection to detect the MA signature in the uplink transmission, and then uses the MA signature to decode the data of the uplink transmission. Step 438 is optional.

Figure 7:
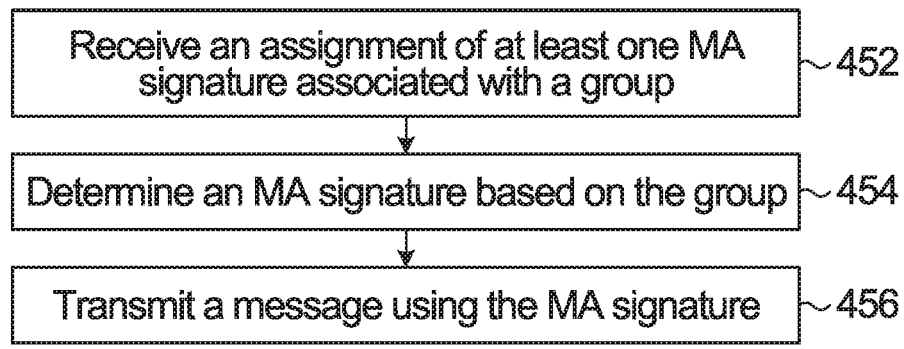
FIG. 7 is a flowchart of a method performed by a UE, according to another embodiment.

FIG. 7 is a flowchart of a method performed by UE 102a, according to another embodiment. In step 452, the UE 102a receives from a base station an assignment of at least one MA signature, e.g. in the form of an indication of which group the UE is within. The indication is stored in memory as UE group indicator 268. Step 452 may be implemented by receiver 256 receiving a downlink transmission having the indication and decoding the message to retrieve the indication. Note that step 452 is omitted in some embodiments because, as explained earlier, in some embodiments the UE group selector 272 of UE 102a may instead determine the group the UE is within. Also, in some other embodiments, the assignment of the at least one MA signature received from the base station may be an explicit indication of the at least one MA signature itself. In embodiments in which the assignment is an explicit indication of the at least one MA signature itself, the UE 102a does not necessarily have to know anything about the different groups and/or the group to which the UE belongs. Instead, the UE 102a just uses the one or more MA signatures assigned by the base station. It is the base station that determines the groups, the group to which the UE belongs, and the group to MA signature mapping.

Step 452 is optional in some embodiments, e.g. if the method begins after the assignment of the at least one MA signature.

In step 454, the UE 102a determines a MA signature to use based on the group to which the UE 102a belongs. e.g. from memory 260. For example, UE 102a may retrieve the UE group indicator 268, and based on the UE group indicator 268, the UE 102a may select one of a plurality of MA signatures associated with the group identified by the group indicator. In another embodiment, the UE 102a may determine the MA signature by retrieving from memory an MA signature explicitly assigned by the base station to the UE 102a.

In step 456, the UE 102a then transmits a message using the MA signature.

For example, in one embodiment, the MA signature to UE group mapping 266 may be consulted to determine the mapping between the UE group indicator 268 and the MA signatures. One of the MA signatures associated with the group indicated by the UE group indicator 268 may then be chosen. The MA signature may be utilized in a message that is prepared by the transmitter 254 for uplink transmission. Preparing the message for uplink transmission may include encoding and modulating the message. The message may then be transmitted from the transmitter 254 via antenna 258.

In some embodiments, the assigning of the at least one MA signature to the UE may be signaled semistatically or dynamically, in higher layer signaling (e.g. RRC signaling), and/or in broadcast signaling in a broadcast channel (e.g. in a system information block (SIB)), and/or in a downlink control channel (e.g. downlink control information (DCI)). The signalling may be the group indication that indicates the group assigned to the UE, or an explicit indication of the at least one MA signature assigned to the UE, or the MA signatures themselves that are assigned to the UE.

In some of the embodiments described above, a UE stores an indication of the group to which the UE belongs, e.g. as UE group indicator 268. However, as is clear from other embodiments described above, the base station 100 may determine the group to which the UE belongs, allocate an MA signature or pool of MA signatures to the UE, and then just inform the UE which MA signature or pool of MA signatures the UE is to use.

Figure 8:
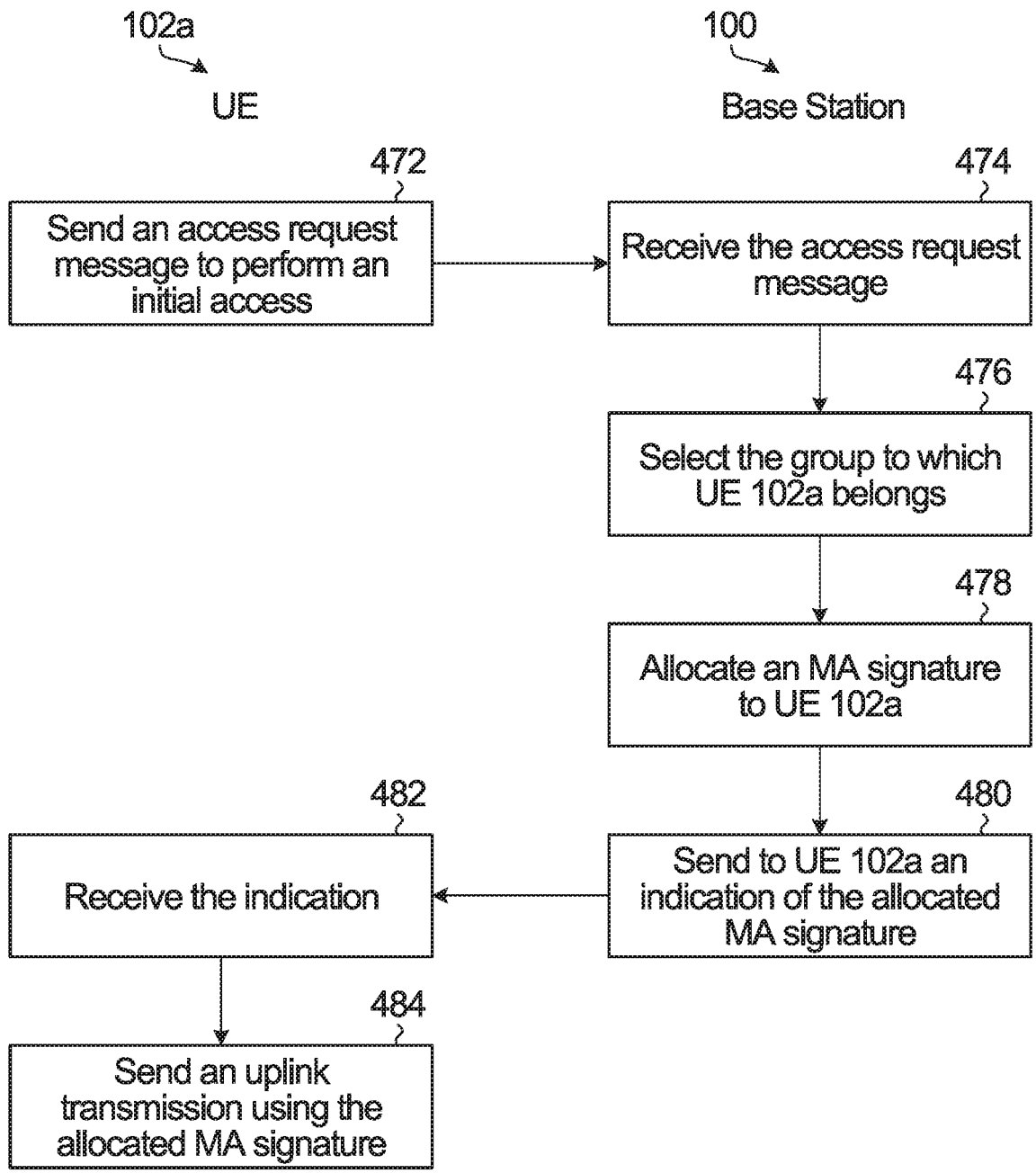
FIG. 8 is a flowchart of a method performed by a base station and a UE, according to another embodiment.

As an example, FIG. 8 is a flowchart of a method performed by the base station 100 and UE 102a, according to another embodiment. UE 102a may be operating in grant-based mode or grant-free mode.

In step 472, UE 102a performs an initial access of the network by sending an access request message to the base station 100. The format of the access request message and the protocol used is implementation specific. As one example, UE 102a may send a random access request (RAR) message as part of a radio resource control (RRC) protocol.

In step 474, the base station 100 receives the access request message.

In step 476, the base station 100 determines the group to which UE 102a belongs. Step 476 may be performed by the UE group separator 212. Example ways of performing step 476 are given above, e.g. the UE group separator 212 may determine the group to which UE 102a belongs based on the physical location of UE 102a.

In step 478, the base station 100 allocates an MA signature to the UE 102a based on the group to which the UE 102a belongs. As one example, the base station 100 may use the MA signature to UE group mapping 216 in memory 214 in order to determine the possible MA signatures that can be allocated to UE 102a, and then the base station 100 may select one of the possible MA signatures as the MA signature to be allocated to UE 102a.

In step 480, the base station 100 sends to UE 102a an indication of which MA signature has been allocated to the UE 102a. In some embodiments, the indication may have one of the following forms: the indication may be the MA signature itself; or the indication may be an index representing the MA signature; or the indication may be a group index representing the group to which the UE 102a belongs, as well as the MA signature itself or an index identifying the MA signature.

In step 482, the UE 102a receives the indication. In step 484, the UE 102a sends an uplink transmission using the allocated MA signature.

The allocation by the base station 100 in step 478 may be semi-static if the UE 102a is operating in grant-free mode. The MA signature allocated to the UE 102a may be semi-statically configured in higher layer signaling, e.g. RRC signaling, or through downlink control information (DCI).

The allocation by the base station 100 in step 478 may be dynamic if the UE 102a is operating in grant-based mode. The dynamic allocation may be through DCI.

In some embodiments, an MA signature hopping pattern exists that is known to both UE 102a and the base station 100. The MA signature allocated to UE 102a in step 478 automatically changes on a periodic basis, e.g. every frame or subframe, in accordance with the hopping pattern. Although only one MA signature allocation is sent to UE 102a in step 480, the allocated MA signature will automatically change over time according to the hopping pattern.

In a variation of FIG. 8, the base station instead allocates a pool of MA signatures to UE 102a in step 478. The pool of MA signatures is associated with the group to which the UE 102a belongs. As part of step 484, the UE would then randomly select an MA signature to use from the allocated pool of MA signatures. In some embodiments, an MA signature pool hopping pattern may exist that is known to both UE 102a and the base station 100. The MA signature pool allocated to UE 102*a* may then automatically change on a periodic basis, e.g. every frame or subframe, in accordance with the hopping pattern.

In some embodiments, the BS may send the UE one or a set of MA signatures or reference signal indices. Each UE may be associated with a group index. The UE may derive one or more MA signatures/reference signal sequences based on the assigned MA signature index or reference signal index along with the group index, and then transmit the uplink transmission using at least one of the derived MA signatures/reference signal sequences. The group index may be explicitly assigned to the UE by the BS or determined by the UE from other factors, such as beam index, spatial property of the channel, uplink/downlink measurement. More details about these factors that can be used to determine the group index are described in the following paragraph. In some embodiments, a beam index is used instead of, or in addition to, the group index. In some embodiments, there is no explicit group index, and the UE determines the MA signatures/reference signal sequences based on the assigned MA signature index/reference signal index along with the factors described in this disclosure that determine the group association. The derivation of the MA signature index based on the group index may result in lower correlation among MA signature sequences in the same group and relatively higher correlation among MA signatures in different groups. The methodology and mechanisms described herein still apply. For example, if ZC sequences are used for reference signal sequences, then each beam or group may be associated with a root, and the root may be different for different groups/beams. Each UE may then derive the reference signal sequence using: (i) the assigned reference signal sequence index, typically in terms of cyclic shift of an orthogonal cover code index; (ii) the root associated with the group/beam and (iii) optionally some other factors, such as an antenna port index. In another example, PN sequences are used for DMRS. Each beam or group may be associated with a seed that is used to initiate/derive the PN sequences. The seed may be determined by the beam/group index and the seed can be different for different beams/groups. The BS may assign to each UE an index that determines different orthogonal multiplexing patterns within a group. The UE can then derive its reference signal sequences based on the assigned index (which determines the orthogonal multiplexing pattern) along with the beam/group index (which determines the PN sequence to be used).

The group association may be determined by the BS and then signaled to the UE (e.g. through assigning a group index or beam index), or determined by the UE or the group association, or determined by both BS and UE using the same rule. From either the BS or the UE side, the group association of the UE and/or the MA signature reference sequences assigned to or used by the UE may be determined by at least one of, but not limited to, the factors described earlier in this disclosure and the following factors: a spatial property of the channel, the location of the UE, the angle of arrival of transmissions by the UE, the beam association of the UE, the uplink/downlink measurement, the resource association, the cell or hyper-cell (a group of cells) association. The beam association of the UE may be determined by the beam index associated with the UE, which may be explicitly assigned by the BS or determined by the UE based on other measurements. The uplink/downlink measurement may include, but is not limited to, any large scale channel measurement (such as reference signal received power (RSRP), reference signal received quality (RSRQ), received signal strength indicator (RSSI), path loss measurement, power measurement, timing advance (TA) measurement or any radio resource management (RRM) measurement) and any small scale channel measurement (such as channel state information (CSI), channel quality indicator (CQI), precoding matrix indicator (PMI), rank indicator (RI), Quasi-Co-Location (QCL), any measurement for channel estimation). The resource association used to determine the group association may include, but is not limited to, time and/or frequency resources, spatial resources (such as different beams, different MIMO layers, different pre-coding matrix), code domain resources. MA signature resources. In some embodiments, there may not be an explicit group index, and the UE or BS may determine the MA signature/reference signal sequences to be used for uplink transmission based on the factors described in this disclosure (e.g. beam index) that determine the group association.

Finally, in all of the embodiments described above, the MA signatures assigned to different groups are used for uplink communication. However, the MA signatures can instead be used for downlink communication. For example, the MA signatures assigned for downlink transmission to a UE may be associated with a group (e.g a spatial group) or beam to which the UE belongs. Instead of the method described above in relation to FIG. 6, in another embodiment the base station may perform a method including the following steps: determine the group to which a UE belongs, and send a downlink transmission to the UE using an MA signature from the set of MA signatures associated with the group to which the UE belongs.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a base station comprising: transmitting a message to a user equipment (UE), the message including an indication that indicates to the UE at least one uplink multiple access (MA) signature from a set of uplink MA signatures that are used for uplink transmission and that are associated with a first spatial group to which the UE belongs, the first spatial group being one of a plurality of spatial groups, wherein each one of the plurality of spatial groups has an associated set of uplink MA signatures, and wherein each one of the plurality of spatial groups is associated with a different beam;
receiving an uplink transmission from the UE, the uplink transmission using an uplink MA signature from the at least one uplink MA signature;
wherein the set of uplink MA signatures associated with the first spatial group are reference signal sequences associated with the first spatial group that are used by the base station for uplink channel estimation;
wherein the reference signal sequences associated with the first spatial group are: orthogonal to each other, and non-orthogonal to other reference signal sequences associated with another spatial group of the plurality of spatial groups.

2. The method of claim 1, wherein the UE belongs to the first spatial group based on at least one of:
a physical location of the UE;
a spatial correlation between an uplink channel of the UE and an uplink channel of at least one other UE; and
a beam association for the UE.

3. The method of claim 1, further comprising:
processing the uplink transmission from the UE using beamforming processing that is different from beamforming processing used to process another uplink transmission from another UE in a different spatial group.

4. The method of claim 1, wherein indicating to the UE the at least one uplink MA signature comprises:
transmitting, to the UE, an indication of the first spatial group.

5. The method of claim 4, wherein the indication is semistatically or dynamically signalled, and signaling of the indication occurs in at least one of a broadcast channel, higher layer signaling, and a downlink control channel.

6. The method of claim 1, wherein the uplink transmission received from the UE is a grant-free uplink transmission.

7. A base station comprising:
a user equipment (UE) group separator to determine a first spatial group to which a UE belongs, the first spatial group being one of a plurality of spatial groups, wherein each one of the plurality of spatial groups is associated with a respective set of uplink multiple access (MA) signatures, and wherein each one of the plurality of spatial groups is associated with a different beam;
a transmitter to transmit a message to the UE, the message including an indication that indicates to the UE at least one uplink MA signature from the set of uplink MA signatures associated with the first spatial group;
a receiver to receive an uplink transmission from the UE, the uplink transmission using an uplink MA signature from the at least one uplink MA signature;
wherein the set of uplink MA signatures associated with the first spatial group are reference signal sequences associated with the first spatial group that are used by the base station for uplink channel estimation;
wherein the reference signal sequences associated with the first spatial group are: orthogonal to each other, and non-orthogonal to other reference signal sequences associated with another spatial group of the plurality of spatial groups.

8. The base station of claim 7, wherein the UE belongs to the first spatial group based on at least one of:
a physical location of the UE;
a spatial correlation between an uplink channel of the UE and an uplink channel of at least one other UE; and
a beam association for the UE.

9. The base station of claim 7, wherein the receiver is to process the uplink transmission from the UE using beamforming processing that is different from beamforming processing used to process another uplink transmission from another UE in a different spatial group.

10. The base station of claim 7, wherein the message indicating the at least one uplink MA signature to the UE comprises an indication of the first spatial group.

11. A method performed by a user equipment (UE) comprising:
determining an uplink multiple access (MA) signature from a first set of uplink MA signatures that are used for uplink transmission and that are associated with a first spatial group to which the UE belongs, the first spatial group being one of a plurality of spatial groups, wherein each one of the plurality of spatial groups has an associated set of uplink MA signatures, and wherein each one of the plurality of spatial groups is associated with a different beam; and
transmitting an uplink transmission using the uplink MA signature;
wherein the first set of uplink MA signatures are reference signal sequences used by a base station for uplink channel estimation;
wherein the reference signal sequences are: orthogonal to each other, and non-orthogonal to other reference signal sequences associated with another spatial group of the plurality of spatial groups.

12. The method of claim 11, further comprising receiving a message indicating the uplink MA signature from the base station.

13. The method of claim 11, further comprising receiving a message, from the base station, that indicates the first spatial group; and wherein determining the uplink MA signature comprises: the UE retrieving, from memory of the UE, the uplink MA signature based on the indication of the first spatial group.

14. The method of claim 11, further comprising the UE determining the first spatial group; and wherein determining the uplink MA signature comprises:
the UE retrieving, from memory of the UE, the uplink MA signature based on an indication of the first spatial group.

15. A user equipment (UE) comprising:
a memory to store at least one uplink multiple access (MA) signature belonging to a first set of uplink MA signatures that are used for uplink transmission and that are associated with a first spatial group to which the UE belongs, the first spatial group being one of a plurality of spatial groups, wherein each one of the plurality of spatial groups is associated with a respective set of uplink MA signatures, and wherein each one of the plurality of spatial groups is associated with a different beam;
a transmitter to transmit an uplink transmission using the at least one uplink MA signature;
wherein the first set of uplink MA signatures are reference signal sequences used by a base station for uplink channel estimation;
wherein the reference signal sequences are: orthogonal to each other, and non-orthogonal to other reference signal sequences associated with another spatial group of the plurality of spatial groups.

16. The UE of claim 15, further comprising a receiver to receive a message indicating the at least one uplink MA signature from the base station.

17. The UE of claim 16, wherein the indication indicates the first spatial group.

18. The UE of claim 15, further comprising a UE group selector to determine the first spatial group.

* * * * *